July 2, 1929.   M. GROHEK   1,719,223
PIPE COUPLING FOR STEAM AND AIR PIPES
Filed March 22, 1928
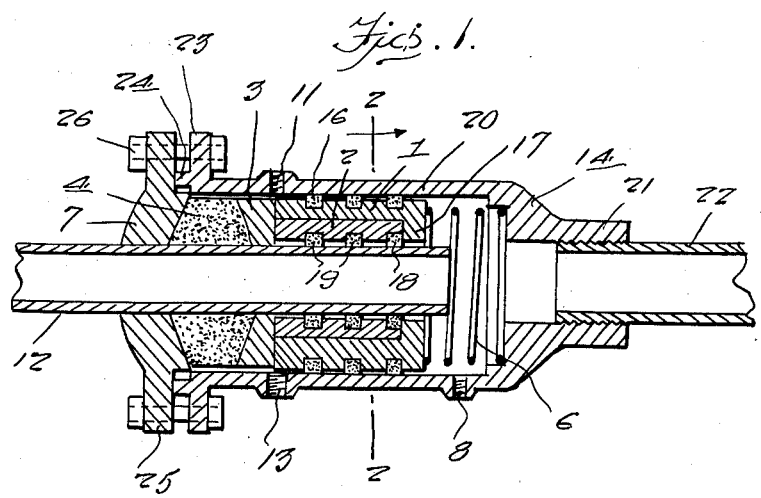
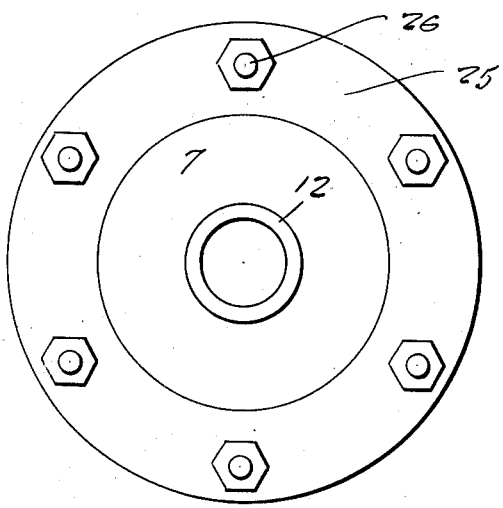
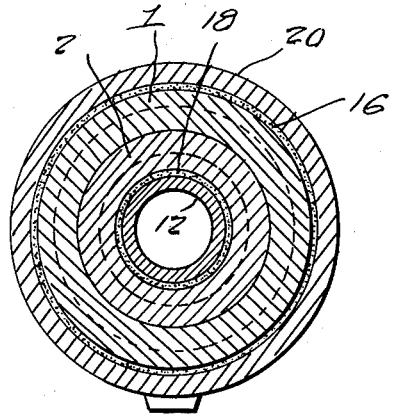
Inventor
M. Grohek
By Clarence A. O'Brien
Attorney Patented July 2, 1929.

1,719,223

UNITED STATES PATENT OFFICE.

MATT GROHEK, OF SUPERIOR, WISCONSIN.

PIPE COUPLING FOR STEAM AND AIR PIPES.

Application filed March 22, 1928. Serial No. 263,704.

The present invention relates to pipe couplings for steam and air pipes which permit two pipes to move lengthwise relative to each other for effecting a connection between the same. Couplings of this character are employed, for example, in conducting water, steam or air or other fluid from one of the vehicles of a train to another and in like circumstances and it is necessary that they be provided with a sufficient degree of slidability to provide for a ready relative movement between the said vehicles without leakage at the joints of said connection.

The main object of the present invention is to provide an improved steam pipe joint wherein friction is reduced to a minimum and leakage of steam at the joint is avoided.

Another object is to provide a joint construction characterized by simplicity of construction and minimum requirement in the way of space occupied.

A further object is to provide a construction of the sliding joint type capable of being readily disassembled, when required, easily lubricated, involving a minimum of wear, and capable of ready adjustment.

With the above and numerous other objects in view as will appear as the description proceeds, the invention resides in certain novel features of construction, and in the combination and arrangement of parts as will be hereinafter more fully described and claimed.

In the drawing:

Figure 1 is a longitudinal section through the coupling embodying the features of this invention, Figure 2 is a transverse section therethrough taken substantially on the line 2—2 of Figure 1, and Figure 3 is an end elevation thereof.

Referring to the drawing in detail it will be seen that the numeral 1 denotes an outside piston with three outside piston rings 16 thereon and formed at one end with an inwardly directed flange 17 which extends over the adjacent end of the inner piston 2 to guard the inner piston and provide a seat on one side of the inner piston and its end ring 18. The inner piston is provided with two other rings 19. These rings 18 and 19 are interior of the inner piston. The inner piston 2 is shorter than the outer piston so that the flange 12 may overlap one end thereof.

A piston and packing cone 3 is disposed against the other end of the pistons 1 and 2 and packing 4 is disposed against the piston and packing cone 3. The parts thus far described are housed in a casing 20 tapered at one end as at 14 and terminating in a cylindrical reduced portion 21 internally threaded to receive pipe 22.

A flange 23 of annular construction is disposed exteriorly of the outer end of the casing 20 and an abutment extension 24 projects in extension of said other end. A packing cover 7 has an annular flange 25 bolted as at 26 to the flange 23 so that the flange 25 abuts the extension 24 and the cover 7 and the piston 3 compress the packing 4 therebetween within said other end of the casing. A pipe 12 is slidable through the cover, the packing, the piston and packing cone and the rings 19 and 18. A water drain is provided in the bottom of the casing adjacent the paper portion 14 by means of a threaded orifice 8 so that water which collects in the casing at this point may be drained therefrom. The upper portion of the casing 20 adjacent said other end is provided with a threaded orifice 11 for an oil pipe connection. A threaded orifice 13 is provided in the bottom of the casing adjacent said other end to provide a water drain and a pipe may be connected therewith having a valve therein.

From the above detailed description it will be seen that there are no parts likely to become broken when installed or which will require attention. The pistons 1 and 2 in conjunction with the packing provided will hold the steam to do its work instead of blowing out. It is thought that the construction, utility and advantages of this invention will now be quite apparent to those skilled in this art without a detail description thereof.

The present embodiment of the invention has been disclosed in detail merely by way of example since in actual practice it attains the features of advantage enumerated as desirable in the statement of the invention and the above description.

It will be apparent that changes in the details of construction, and in the combination and arrangements of parts may be resorted to without departing from the spirit or scope of the invention as hereinafter claimed or sacrificing any of its advantages.

Having thus described my invention, what I claim as new is:

1. In a device of the class described, a casing, an outer piston in the casing, an inner piston within the outer piston, piston rings about the outer piston, piston rings within the inner piston, a member slidable through the inner piston rings, a piston and packing cone about the member and abutting ends of the pistons, packing in the casing against the cone, a cover attached to the casing to hold the packing in place, said member being slidable through the piston and packing cone, the packing and the cover, the end of the casing adjacent the cover being provided with an abutment extension, bolts engaging the cover and the casing to hold the cover against the extension, and a spring in the other end of the casing impinging against said other end and the outer piston.

2. In a device of the class described, a casing, an outer piston in the casing, an inner piston within the outer piston, piston rings about the outer piston, piston rings within the inner piston, a member slidable through the inner piston rings, a piston and packing cone about the member and abutting ends of the pistons, packing in the casing against the cone, a cover attached to the casing to hold the packing in place, said member being slidable through the piston and packing cone, the packing and the cover, the end of the casing adjacent the cover being provided with an abutment extension bolts engaging the cover and the casing to hold the cover against the extension, and a spring in the other end of the casing impinging against said other end and the outer piston, said outer piston being provided with a flange adjacent the spring overlapping the adjacent end of the inner piston.

In testimony whereof I affix my signature.

MATT GROHEK.